United States Patent [19]

Jalufka et al.

[11] 4,110,703
[45] Aug. 29, 1978

[54] VOLUMETRIC DIRECT NUCLEAR PUMPED LASER

[76] Inventors: James C. Fletcher, Administrator of the National Aeronautics and Space Administration, with respect to an invention of Nelson W. Jalufka, Yorktown; Frank Hohl, Newport News; Russell J. DeYoung; Michael D. Williams, both of Hampton, all of Va.

[21] Appl. No.: 788,704

[22] Filed: Apr. 19, 1977

[51] Int. Cl.² ............................................. H01S 3/09
[52] U.S. Cl. .......................... 331/94.5 P; 331/94.5 G
[58] Field of Search ..................... 331/94.5 P, 94.5 G; 330/4.3

[56] References Cited
PUBLICATIONS

Young et al., Nuclear-pumped Lasing of $^3$He-Xe and $^3$He-Kr, App. Phys. Lett., vol. 30, No. 1 (Jan. 1, 1977), pp. 19-21.

Primary Examiner—William L. Sikes
Attorney, Agent, or Firm—William H. King; John R. Manning; Howard J. Osborn

[57] ABSTRACT

A volumetric direct nuclear pumped laser has been developed in which the gas is a mixture of $^3$He and a minority gas from the group of argon, krypton, xenon, chlorine and fluorine. The mixture of $^3$He and the minority gas produces lasing with a minority gas concentration of from 0.01 to 10 percent argon, 1 percent krypton, 0.01 to 5 percent xenon and small concentrations of chlorine or fluorine.

12 Claims, 6 Drawing Figures

VOLUMETRIC DIRECT NUCLEAR PUMPED LASER

ORIGIN OF THE INVENTION

The invention described herein was made in the performance of work under a NASA contract and is subject to the provisions of section 305 of the National Aeronautics and Space Act of 1958, Public Law 85-568 (72 Stat. 435; 42 USC 2457).

BACKGROUND OF THE INVENTION

The pumping of a gaseous laser medium by nuclear reaction products to excite a population inversion is a known technique. Lasers which employ such techniques are generally referred to as direct nuclear-pumped lasers since the nuclear reaction products are used to directly ionize and excite the laser medium. Such lasers have the potential for high-power applications since existing nuclear reactors produce large neutron fluxes and the neutrons can penetrate a high-pressure gas and excite nuclear reactions uniformly throughout the gas volume. Previous direct nuclear-pumped lasers have relied on a coating of solid $^{10}B$ or $^{235}U$ to produce nuclear reaction products when bombarded by thermal neutrons.

The primary disadvantage of previous direct nuclear-pumped lasers is their reliance on solid coatings of fissionable material, ($^{10}B$ or $^{235}U$). A substantial part of the charged particle energy is lost in traversing the $^{10}B$ or $^{235}U$ coatings as well as the disadvantage of all the reaction products being created at the surface of the laser tube which leads to nonuniform excitation of the laser medium at high pressures.

It has been recognized in the past that $^3He$ in gaseous form could be used in place of solid coatings as the fissionable material. However, as far as the inventors know, no one in the past has been able to achieve lasting in a $^3He$ minority gas mixture.

It is therefore the primary object of this invention to provide a volumetric direct nuclear pumped laser in which gaseous $^3He$ is used as the fissionable material.

Another object of the invention is to provide a volumetric direct nuclear pumped laser in which the gaseous material is $^3He$ mixed with a lasting gas.

Other objects and advantages of this invention will become apparent hereinafter in the specification and drawings.

SUMMARY OF THE INVENTION

The invention is a volumetric direct nuclear pumped laser in which the gas inside the laser cell is a mixture of $^3He$ and a minority gas from the group of argon, krypton, xenon, chlorine and fluorine. The laser includes a gas laser call located between two mirrors; a gas-handling system for introducing the laser gas into the laser cell and for maintaining the proper pressure of the gas; a neutron source for applying a neutrom flux to the gas in the laser cell; and a polyethylene moderator surrounding the laser cell for thermalizing the neutrons produced by the neutron source to take advantage of the large thermal neutron capture cross section of the $^3He$.

DETAILED DESCRIPTION OF THE INVENTION

Figure 1:
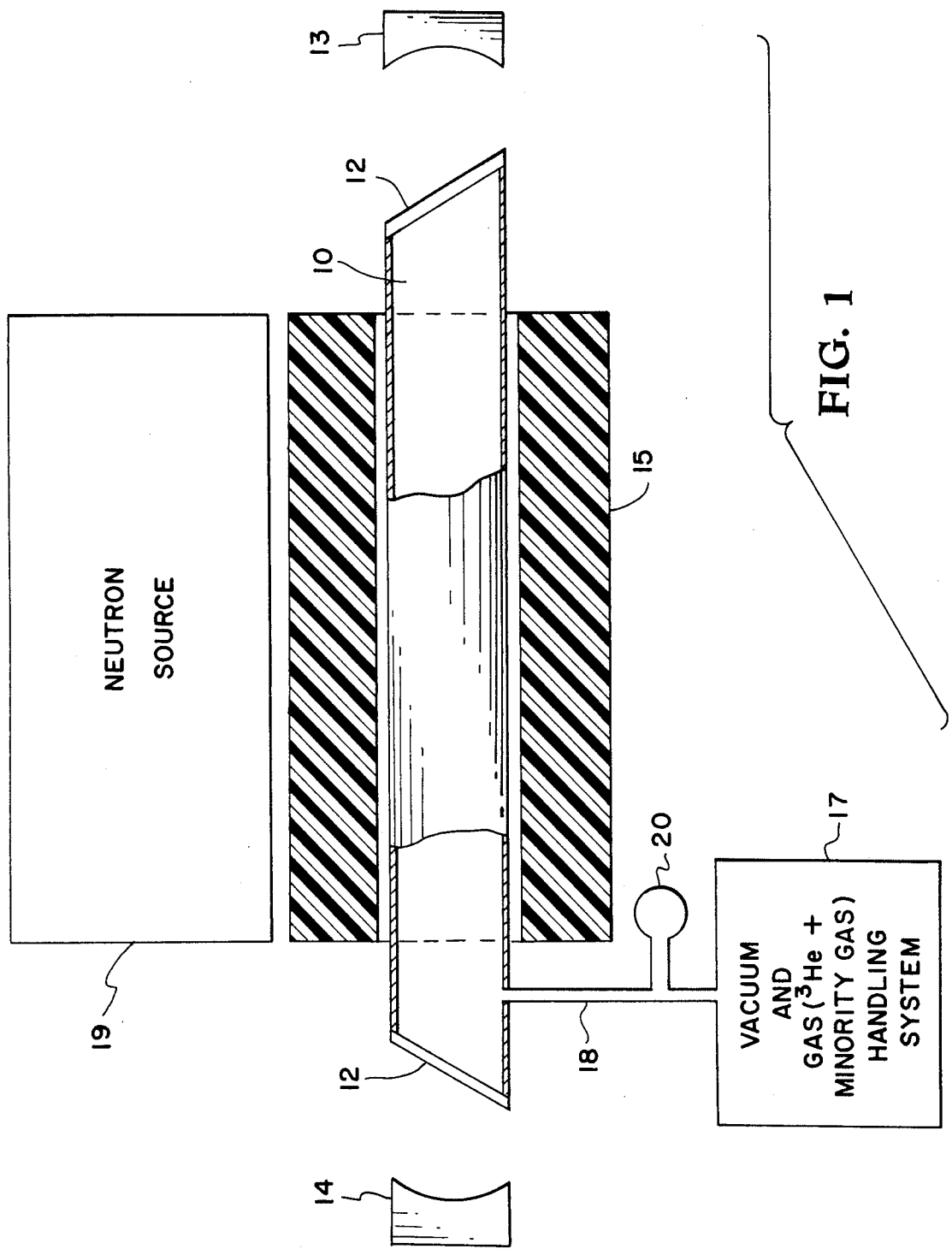
FIG. 1 is a schematic drawing of an embodiment of the invention.

Turning now to the embodiment of the invention selected for illustration in the drawing, number 10 of FIG. 1 designates a laser cell which is constructed of quartz tubing and provided with windows 12 at both ends cut at Brewster's angle. The laser cell is placed between mirrors 13 and 14. Mirror 13 is the output mirror and, as such, has a transmission greater than mirror 14. The reflectivities of the mirrors should be of the order of 95 percent to reduce losses in the cavity while power is building up in the laser active medium. In a system tested (He-Ar) mirror 13 had a reflectivity of 98.8 percent and a transmission of 1 percent, while mirror 14 had a reflectivity of 99.8 percent at $1.7\mu$.

A polyethylene moderator 15 surrounds the laser cell and is used to thermalize the fast neutrons produced by a neutron source 19 to take advantage of the large thermal neutron capture cross section of the $^3He(n,p)^3H$ reaction. The length of the laser cell and the polyethylene moderator is generally determined by the dimensions of the neutron source. The laser cell is connected to a vacuum and gas-handling system 17 via a vacuum line 18. The gas-handling system 17 is used to introduce gas into the laser cell 10 and to maintain the proper pressure of the gas. The vacuum system is used to evacuate the gas when desired.

The device may be operated as a quasi-steady-state laser, or as a pulsed laser. The quasi-steady-state operation with a sufficient neutron flux provided, lasing action may be made continuous. In the pulsed mode of operation, gas is introduced into the laser cell 10 by the gas-handling system 17. Neutron source 19 is then pulsed. Pulsing of the gas mixture may be repetitive or the laser cell 10 may be evacuated by the vacuum and gas-handling system 17 after each pulse and then refilled. The gas which is introduced into the laser cell 10 is a mixture of two gases, a majority gas and a minority gas. The majority gas is the isotope $^3He$ which absorbs the thermalized neutrons and produces a high-energy proton plus a triton. The protons and tritons then ionize and excite the gas mixture. The majority gas also has metastable states which upon creation can transfer energy to the minority gas atoms thereby ionizing them. The minority gases which have operated successfully in this system are argon, krypton, xenon, chlorine and fluorine. The minority gases are ionized by direct collisions with the secondary electrons (produced by the proton collisions) but primarily by collisions with $^3He$ atoms in metastable states. The atomic ions so produced then recombine by electron-ion recombination eventually populating the upper laser level. When a sufficient population inversion density has been created, lasing takes place between the upper and lower laser levels. This lasing has been observed in argon (at 1.79μ and 1.27μ), krypton (at 2.52μ), xenon (at 2.026μ), chlorine (at 1.6μ) and fluorine (at 0.7129μ and 0.7311μ).

The mixture of $^3$He and a minority gas produces lasing with a minority gas concentration of from 0.01 to 10 percent argon, approximately 1 percent krypton, 0.01 to 5 percent xenon, approximately 0.008 percent chlorine and approximately 0.1 percent fluorine. Too small a concentration of the minority gas means that not enough excited states can be created in the mixture to produce lasing. Too high a concentration of the minority gas will also fail to create enough excited states to produce lasing. Thus an optimum minority gas concentration exists. The total pressure of the $^3$He minority gas mixture, as well as the neutron flux, is also a limiting factor as too low a pressure or thermal neutron flux will result in insufficient excited states being created and, hence, no lasing can take place. With a tube diameter of 1.9 cm i.d. and 60 cm active length, lasing has been obtained at total pressures of from 200 Torr to 3000 Torr (4 atmospheres). The thermal neutron flux must be above a certain threshold value in order to produce a sufficient population inversion to achieve lasing. This was observed to be approximately $2.5 \times 10^{16}$ neutrons/cm$^2$-sec. for 10 percent argon in $^3$He, $1.1 \times 10^{17}$ neutrons/cm$^2$-sec. for 1 percent krypton in $^3$He and $4 \times 10^{15}$ neutrons/cm$^2$-sec. for 1 percent xenon in $^3$He.

Figure 2:
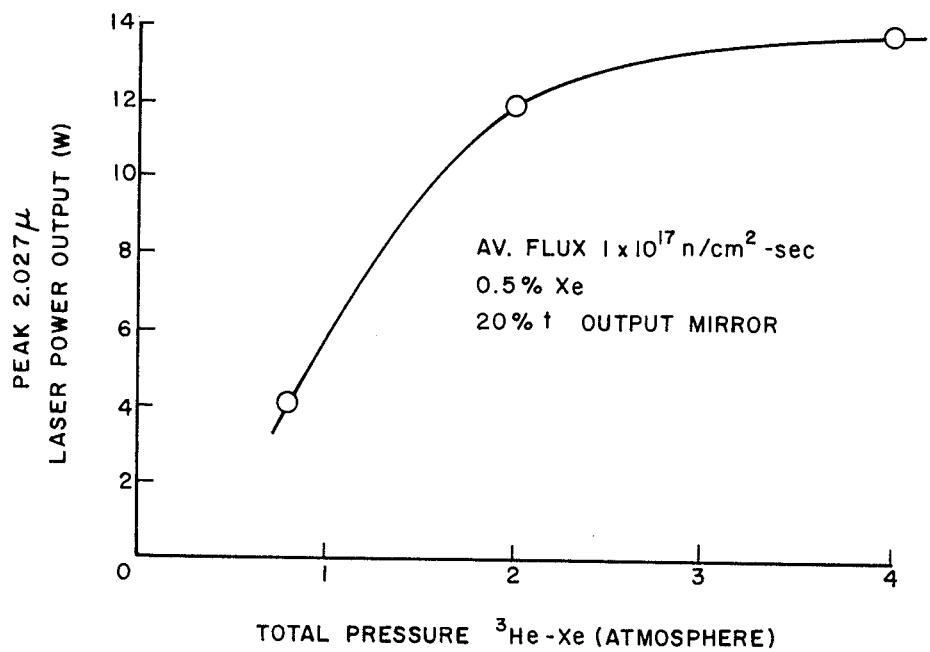
FIG. 2 is a graph of the output of a nuclear-pumped laser having a gas mixture of $^3He$ and xenon versus the total pressure of the mixture.
Figure 3:
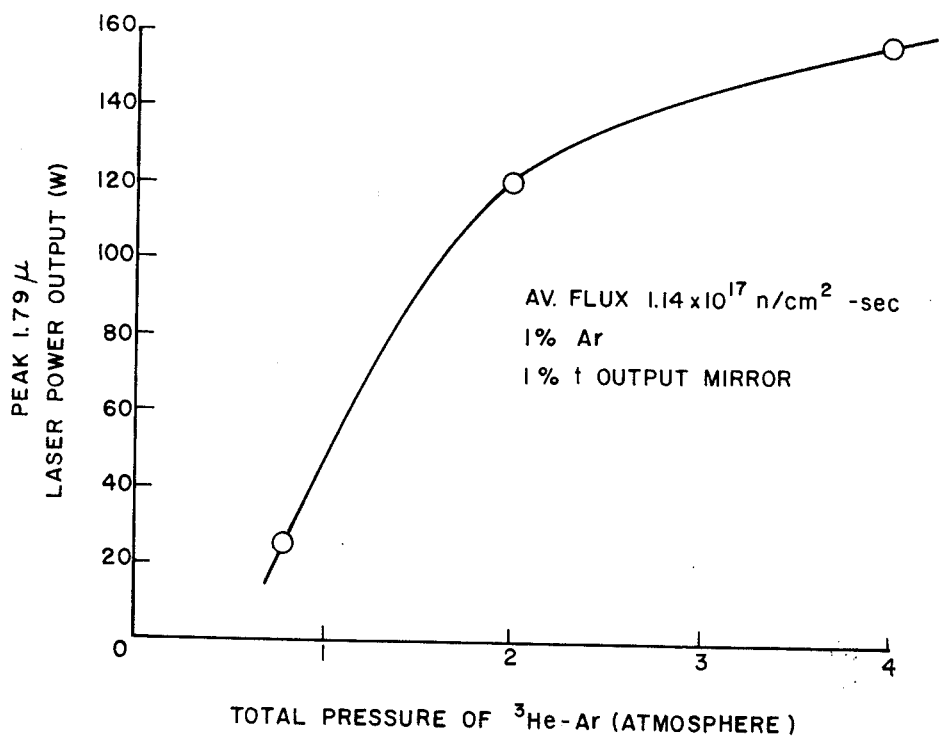
FIG. 3 is a graph of the output of a nuclear-pumped laser having a gas mixture of $^3He$ and argon versus the total pressure of the mixtures.

In FIG. 2 the 2.027μ laser output is shown as a function of $^3$He-Xe total pressure with a fixed concentration of 0.5% Xe. Laser output increases with increasing pressure since more $^3$He(n,p)$^3$H reactions take place and, in addition, the proton slows down in a shorter distance, thus depositing more of its energy in the gas media. In FIG. 3, similar results are shown for the $^3$He - Ar laser. As with other neutral laser systems, laser output tends to saturate with increasing pressure.

Figure 4:
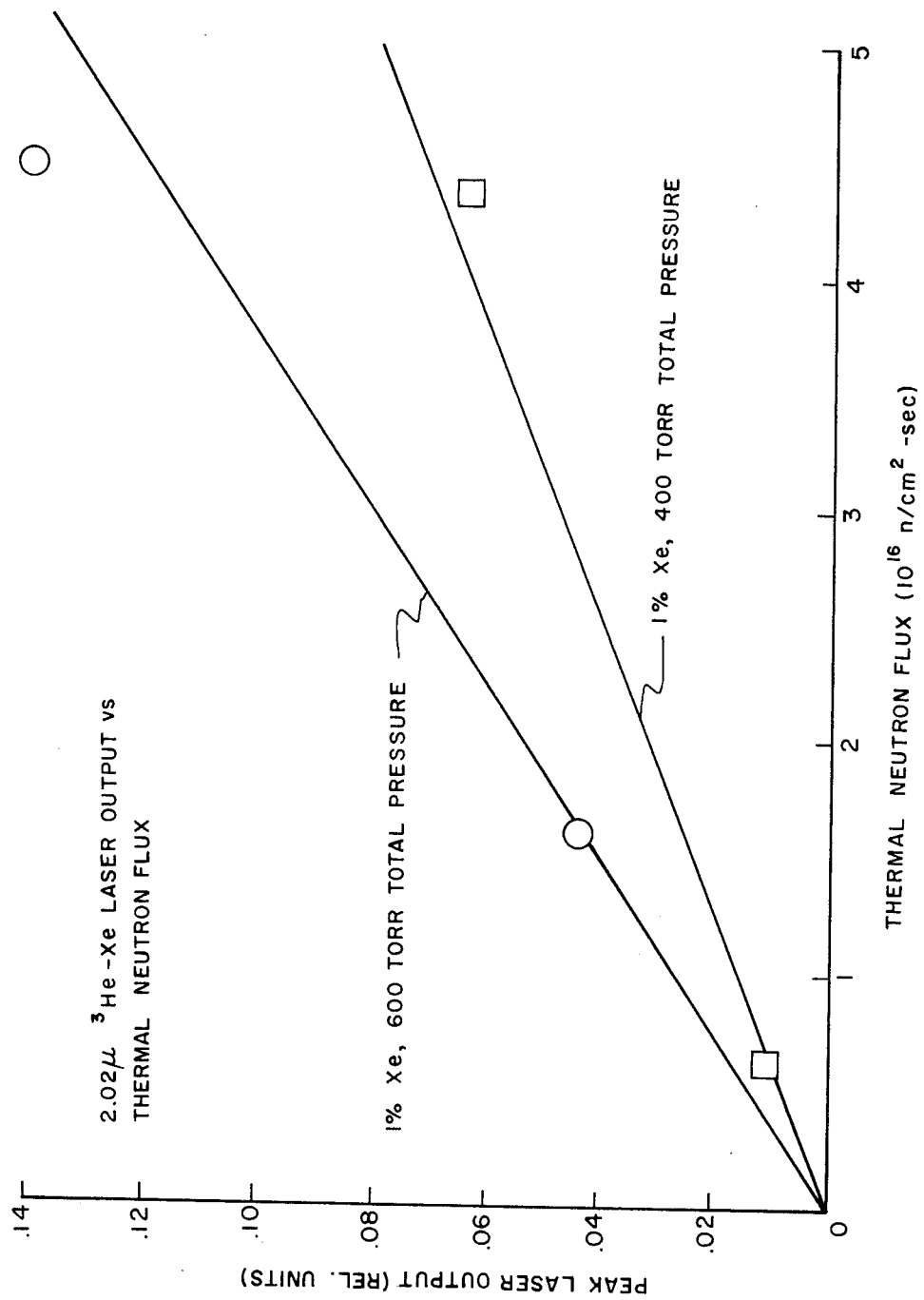
FIG. 4 is a graph of the output of a nuclear pumped laser having a gas mixture of $^3He$ and xenon versus average thermal neutron flux.

Scaling of laser output with average thermal neutron flux is shown in FIG. 4. The total pressure was held constant at 400 or 660 Torr $^3$He-Xe with 1 percent Xe.

Figure 5:
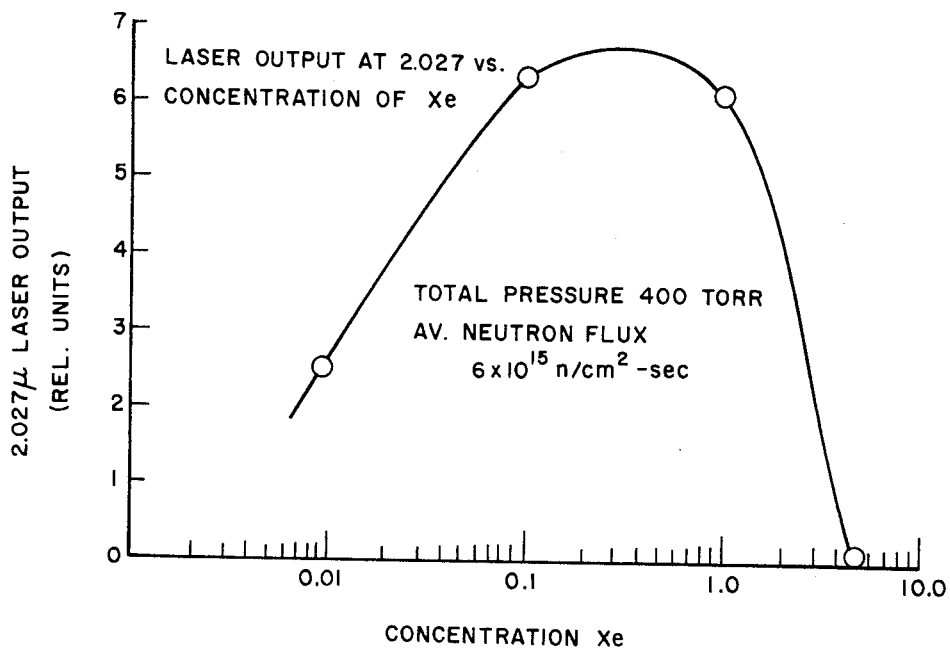
FIG. 5 is a graph of the output of a laser having a gas mixture of $^3He$ and xenon versus percent concentration of xenon.

FIG. 5 shows the results of a Xe concentration study. Maximum lasing output occurs between 0.1 and 1.0 percent Xe with the total pressure held constant at 400 Torr and with an average neutron flux of $6 \times 10^{15}$ n/cm$^2$-sec.

Figure 6:
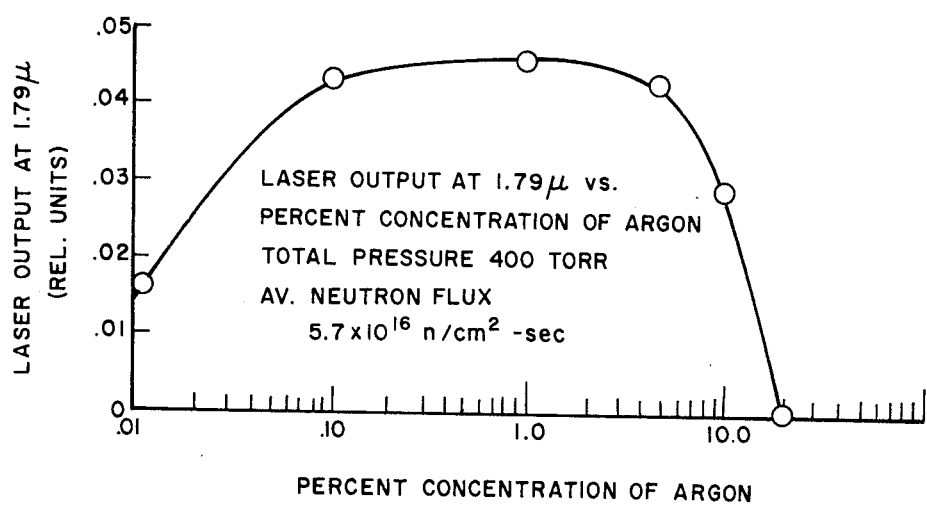
FIG. 6 is a graph of the output of a laser having a gas mixture of $^3He$ and argon versus percent concentration of argon.

FIG. 6 shows how the output of a laser at 1.79μ changes with percent concentration of argon in the gas mixture. To obtain this curve the total pressure was maintained at 400 Torr and the average neutron flux was $5.7 \times 10^{16}$ n/cm$^2$-sec. Here peak laser output occurs between 0.1 percent and 5.0 percent argon.

The advantage of this invention is the direct conversion of nuclear energy (neutron flux) into directional laser light through the use of the $^3$He(n,p)$^3$H reaction. The use of gaseous $^3$He gives uniform, volumetric excitation at high pressures which cannot be achieved by the method of coating the tube walls with a fissionable solid material.

What is claimed is:

1. A volumetric direct nuclear pumped laser comprising:
   a gas laser cell located between two mirrors to form a resonant cavity, one of said two mirrors having a transmission greater than the other of said two mirrors and being the output mirror of said nuclear pumped laser;
   a gas mixture consisting of $^3$He and a minority gas from the group of argon, krypton, xenon, chlorine and fluorine;
   a gas-handling system for introducing said gas mixture into said laser cell and for maintaining the proper pressure of the gas mixture;
   a neutron source for applying a neutron flux of sufficient density to the gas mixture in said laser cell to pump the gas mixture; and
   a moderator surrounding said laser cell for thermalizing the neutrons produced by the neutron source to take advantage of the large thermal neutron capture cross section of the $^3$He.

2. A volumetric direct nuclear pumped laser according to claim 1 wherein the pressure of said gas mixture is from 200 Torr to 3000 Torr.

3. A volumetric direct nuclear pumped laser according to claim 2 wherein said minority gas is argon.

4. A volumetric direct nuclear pumped laser according to claim 3 wherein said gas has a concentration of from 0.01 to 10 percent argon.

5. A volumetric direct nuclear pumped laser according to claim 4 wherein said neutron flux has a threshold value of approximately $2.5 \times 10^{16}$ neutrons/cm$^2$-sec. for 10 percent argon in $^3$He.

6. A volumetric direct nuclear pumped laser according to claim 2 wherein said minority gas is krypton.

7. A volumetric direct nuclear pumped laser according to claim 6 wherein said neutron flux has a threshold value of approximately $1.1 \times 10^{17}$ neutrons/cm$^2$-sec. for 1 percent krypton in $^3$He.

8. A volumetric direct nuclear pumped laser according to claim 2 wherein said minority gas is xenon.

9. A volumetric direct nuclear pumped laser according to claim 8 wherein said gas mixture has a concentration of from 0.01 to 5 percent xenon.

10. A volumetric direct nuclear pumped laser according to claim 9 wherein said neutron flux has a threshold value of approximately $4 \times 10^{15}$ neutron/cm$^2$-sec. for xenon in $^3$He.

11. A volumetric direct nuclear pumped laser according to claim 2 wherein said minority gas is chlorine lasing at 1.6μ.

12. A volumetric direct nuclear pumped laser according to claim 2 wherein said minority gas is fluorine lasing at 0.7129μ.

* * * * *